UNITED STATES PATENT OFFICE.

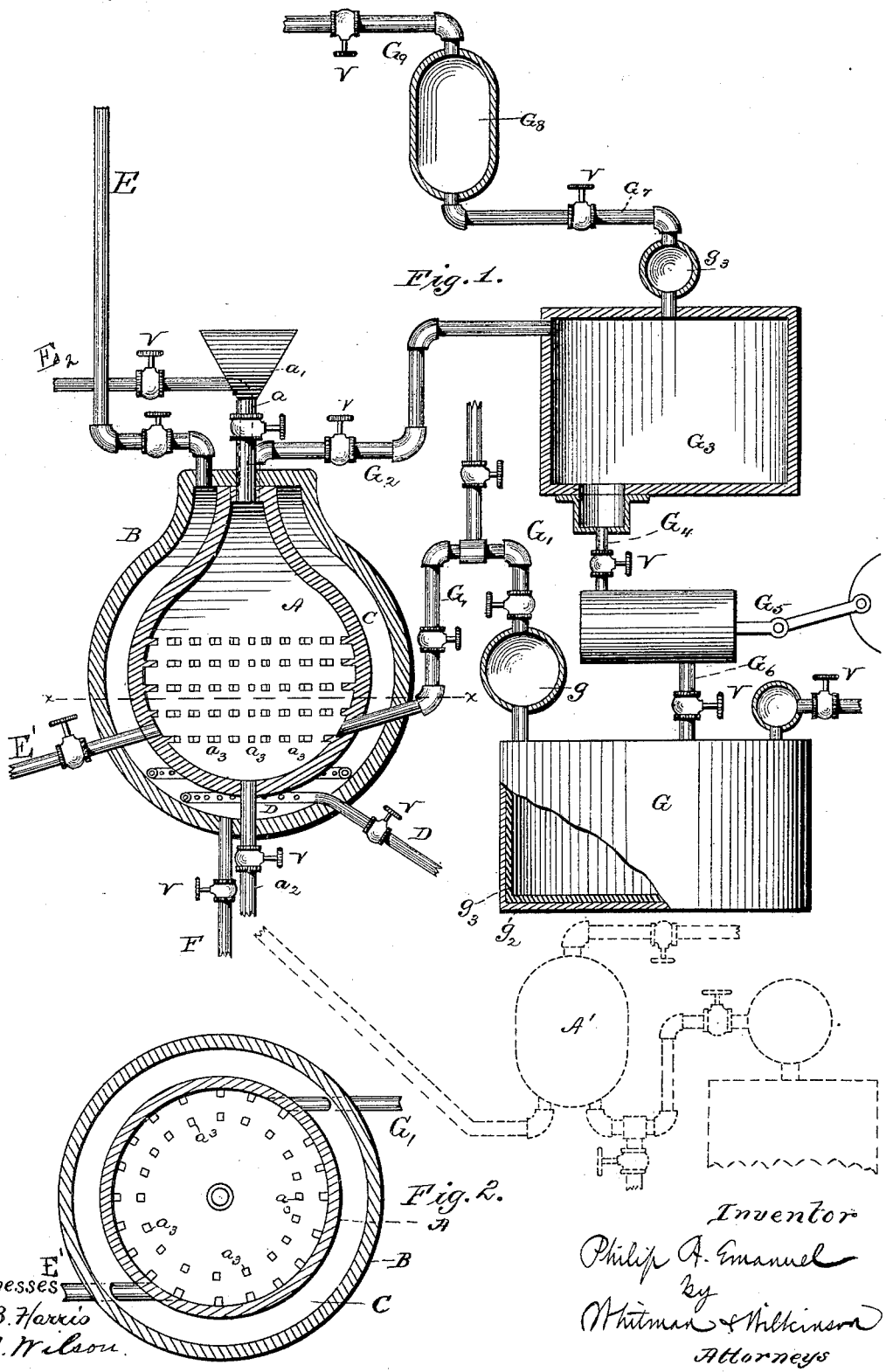

PHILIP A. EMANUEL, OF AIKEN, SOUTH CAROLINA.

REDUCTION OF ALUMINIUM SULPHATE TO SULPHIDE.

SPECIFICATION forming part of Letters Patent No. 462,245, dated November 3, 1891.

Application filed January 26, 1891. Serial No. 379,119. (No specimens.)

*To all whom it may concern:*

Be it known that I, PHILIP A. EMANUEL, a citizen of the United States, residing at Aiken, in the county of Aiken and State of South Carolina, have invented certain new and useful Improvements in the Reduction of Aluminium Sulphate to Sulphide; and I do hereby declare the following to be a full, clear, and exact description of the invention, such as will enable others skilled in the art to which it appertains to make and use the same.

My present invention relates to the preparation of sulphide of aluminium from kaolin and other ores of aluminium with a view to the further reduction of said sulphide to the metal, as is described in a prior application.

The bonds uniting aluminium and sulphur being weaker than those uniting aluminium and oxygen, the sulphur is more easily split off than the oxygen, and hence the advantages of the sulphide over the oxide in reduction is apparent.

In a prior application for a patent filed December 29, 1890, Serial No. 376,105, I have described a process for separating kaolin into its component oxides—silica, alumina, and ferric oxide—by first treating the kaolin with sulphuric acid, thereby forming sulphate of aluminium and afterward reducing this aluminium sulphate to alumina by heating with sulphur. In another application filed January 17, 1891, Serial No. 378,109, I prepare aluminium sulphide from alumina by treating the said alumina with carbon bisulphide under pressure.

My present invention does away with the intermediate step and I accomplish the conversion of aluminium sulphate into aluminium sulphide in one step. This sulphide may afterward be reduced to metallic aluminium in any convenient way.

My process consists, briefly, in subjecting a mixture of dry sulphate of aluminium and carbon bisulphide to a high heat. This may be done either by placing the dry sulphate in a closed retort and injecting $CS_2$ vapor under pressure, heating the retort during the treatment, or by mixing the dry sulphate with the liquid carbon-bisulphide in suitable proportions and charging the retort therewith. Fine divided sulphur may be added in either case to promote the reaction. The reaction without the sulphur would probably be:

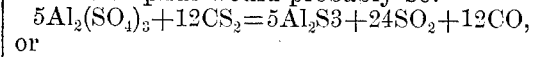

or

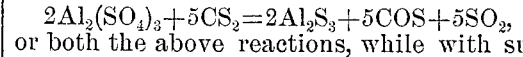

or both the above reactions, while with sulphur a third reaction may occur with or supplant either one or both of the above. This reaction is:

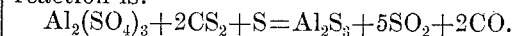

The sulphur mixed in while normally tending to reduce $Al_2(SO_4)_3$ to $Al_2O_3$ when attacking said sulphate together with $CS_2$ vapor under pressure probably reduces the sulphate to $Al_2S_3$ without the intermediate product $Al_2O_3$, which latter is very refractory and unmanageable. If the $Al_2O_3$ is formed, however, before the compound has become permanent and while the component atoms are nearly in the nascent state, it is attacked by the $CS_2$ vapor and is readily converted into $Al_2S_3$. The greatest trouble with the previous methods of preparing the sulphide from the oxide being the formation of the granular mass of $Al_2O_3$ of a viscous coating of $Al_2S_3$, which is not acted upon by and is impervious to $CS_2$ vapor, and hence shields the $Al_2O_3$ core from further attacks of the said $CS_2$.

In my process the formation of some $Al_2O_3$ may be unavoidable; but I reduce the usually large per cent. to a very small one, and this small proportion does not interfere with the reaction in any way. While this conversion to the sulphide and subsequent reduction to the metal may be accomplished in any suitable apparatus, I have designed an apparatus for the purpose, which will be hereinafter described.

Reference is had to the accompanying drawings, wherein the same parts are indicated by the same letters.

Figure 1 represents a detail view, partly in section, of my apparatus. Fig. 2 represents a section of the retort along the line $x\ x$ of Fig. 1.

A represents a retort of suitable material and capable of standing a high heat.

$a$ is the feed-pipe, having funnel $a'$, and $a^2$ is the discharge-pipe for the aluminium sulphide.

$a^3$, $a^3$, &c., represent jogs or teeth suitably secured on the interior of the retort A.

V V V, &c., represent ordinary stop-valves.

B represents an inclosing vessel or shell, which may be made of iron lined with fire-clay or with any fire-proof material.

In the fire-space C, I have a perforated spiral pipe D for supplying combustible gas or gases, which may be ignited within the closed combustion-chamber by means of an electric spark; but any other means of heating the retort A may be adopted.

E represents an escape-pipe for the products of combustion from the chamber C, while F represents a drain-pipe for carrying off any residual products from the said combustion.

E' represents a pipe leading from the sodium-chamber, (not shown,) and $E^2$ represents a pipe connected to a water-tank, (not shown,) for use when the carbon-bisulphide circuit is not in use. Both of these are described in my application, Serial No. 378,109, filed January 17, 1891.

G represents a reservoir where vapor, either carbon bisulphide or sulphur, may be kept under pressure. I may have any convenient source of heat for the said reservoir.

G is preferably made of iron or steel $g^2$ coated on the interior with the enamel $g^3$ used in ordinary "agate ware." This enamel is found to resist the erosive action of sulphur and carbon-bisulphide fumes, as well as the mineral acids. The pipes forming the carbon-bisulphide circuit may also be lined with the said agate ware.

G may have a dome or drum $g$, from which the pipe G' leads directly to the retort A. This pipe enters the retort in an inclined direction, in order that a rotary motion may be imparted to the fluxed materials.

At the upper end of the retort A, I have a pipe $G^2$ for conveying the waste $CS_2$ fumes to the condensing-chamber $G^3$, whence, by means of the pipe $G^4$, pump $G^5$, and pipe $G^6$, they may be forced back into the reservoir G, and so used over and over again. The condenser $G^3$ must be cooled in some way, and from the dome $g^3$ a pipe $G^7$ leads to a receiver $G^8$ for carbonic-oxide or other gaseous products, while a pipe $G^9$ conducts these to any desired place of combustion or to any gas-escape.

Having thus generally described my apparatus, my process is as follows: The fire under the retort A is started, and then dried pulverized aluminium sulphate and sulphur intimately mixed are inserted into the retort through the funnel $a'$. As soon as the charge is all in A the heated $CS_2$ is turned on under pressure, striking the mixed sulphate and sulphur and converting the sulphate into fluid sulphide, which settles in the bottom of the retort, while $SO_2$ and CO rise up as gases as soon as the $Al_2S_3$ has risen sufficiently high in the retort acted upon by the inrushing $CS_2$ entering at an angle, it begins to rotate, carrying small particles of unreduced $Al_2(SO_4)_3$ and possibly $Al_2O_3$. These through the rotation are not only brought into more immediate contact with the inrushing $CS_2$, but the small jogs or teeth $a^3$ stir up the mixture and at the same time knock off parts of the coating of $Al_2S_3$ from the solid particles of sulphate or oxide, and so promote the reaction. The gases escape into the condenser $G^3$, where the excess of $CS_2$ is condensed into a liquid, the $SO_2$ and CO going off as gases through the pipe $G^7$, receiver $G^8$, and pipe $G^9$. The condensed $CS_2$ is forced by the pump $G^5$ back into the reservoir G for use over again.

By a device similar to that in use for oiling the cylinders for steam-engines a fresh supply of mixed sulphate and sulphur may be added from the top of the retort, while the fused aluminium sulphide may be drawn off from the bottom, and thus the process may be made continuous. The sulphide may be run directly into a retort A' for subsequent reduction to aluminium, or it may be removed and treated elsewhere for reduction into aluminium.

It will be seen that in my apparatus the carbon-bisulphide vapor entering at the bottom in an inclined direction under pressure will pursue a spiral course upward and reach all the parts of the charge. Moreover, the charge, being supplied fresh at the top of the retort, is acted upon by the diluted $CS_2$ vapor, while as it descends the partially-converted material meets the stronger $CS_2$ vapor, becoming almost, if not quite, wholly changed into $Al_2S_3$, while the gaseous products rise upward and are drawn off.

By numerous experiments I am led to believe that by this process the conversion of the sulphate into the sulphide is almost complete, and that the amount of oxide formed—a troublesome and wasteful product—is reduced to an exceedingly small and unimportant quantity. I believe, therefore, that my process for the cheap manufacture of sulphide of aluminium is more perfect than any other now known to chemists.

Having thus described my invention, what I claim, and desire to secure by Letters Patent of the United States, is—

1. The process for the manufacture of aluminium sulphide from the sulphate of aluminium, which consists in subjecting the sulphate in a closed and highly-heated retort to the action of carbon-bisulphide vapor heated and under pressure, substantially as described.

2. The process for the manufacture of aluminium sulphide from the sulphate of aluminium, which consists in mixing the sulphate with sulphur and subjecting the mixture in a closed and highly-heated retort to the action of carbon-bisulphide vapor heated and under pressure, substantially as described.

3. The process for the manufacture of aluminium sulphide from the sulphate of aluminium, which consists in mixing the sulphate with sulphur in a closed and highly-heated retort and injecting heated carbon-bisulphide vapor into the bottom of the said retort, substantially as described.

4. In an apparatus for reducing aluminium sulphide from its sulphate, a retort having teeth or projections on its interior surface, and means for heating the retort, in combination with a reservoir for compressed carbon-bisulphide vapor, a pipe leading from the said reservoir to the retort and entering the retort in an inclined direction, and circulating-passages connected to a pump to carry off the excess of said carbon bisulphide and force it back into the reservoir again, substantially as described.

In testimony whereof I affix my signature in presence of two witnesses.

PHILIP A. EMANUEL.

Witnesses:
M. B. WOODWARD,
W. QUITMAN DAVIS.